United States Patent [19]
Round et al.

[11] Patent Number: 5,921,745
[45] Date of Patent: Jul. 13, 1999

[54] LOW HEAD TURBINE

[75] Inventors: George F. Round, Burlington; Viljo K. Valavaara, Scarborough, both of Canada

[73] Assignee: Hydroenergy Corporation, Don Mills, Canada

[21] Appl. No.: 08/939,664

[22] Filed: Sep. 29, 1997

[51] Int. Cl.[6] ........................................................ F03B 3/04
[52] U.S. Cl. ...................... 415/4.2; 415/3.1; 415/122.1; 415/184; 415/906
[58] Field of Search .................................. 415/122.1, 3.1, 415/4.2, 4.3, 4.4, 4.5, 184, 906, 907, 908; 416/DIG. 5; 60/398; 290/52, 53, 42

[56] References Cited

U.S. PATENT DOCUMENTS

| | | | |
|---|---|---|---|
| 1,504,776 | 8/1924 | Nagler | 290/52 |
| 4,076,448 | 2/1978 | Sanders, Jr. | 415/906 |
| 4,416,584 | 11/1983 | Norquest | 60/398 |
| 4,606,704 | 8/1986 | Sloan | 60/398 |

*Primary Examiner*—Christopher Verdier
*Assistant Examiner*—Richard Woo

[57] ABSTRACT

A low speed water driven turbine having a housing to be erected vertically in a water course, a water intake and a water outlet, a drive shaft rotatably mounted along a central vertical axis of the housing, a shaft sleeve non-rotatably mounted in the housing and supporting and enclosing the shaft, a guide casing of generally bell-like shape and defining a lower edge, the casing being connected to the shaft sleeve within the housing and extending outwardly from the sleeve to define a reduced cross-sectional area within the housing in the region of the guide casing, a turbine blade mounting hub driveably mounted at the lower end of the shaft, a plurality of turbine blades mounted around the hub and extending outwardly therefrom the turbine blades being mounted at angles with respect to the vertical axis of the housing, and being located to receive water from the reduced cross-sectional portion of the casing, so that water passing down through the housing will flow onto and past the turbine blades and cause rotation of the shaft.

13 Claims, 4 Drawing Sheets

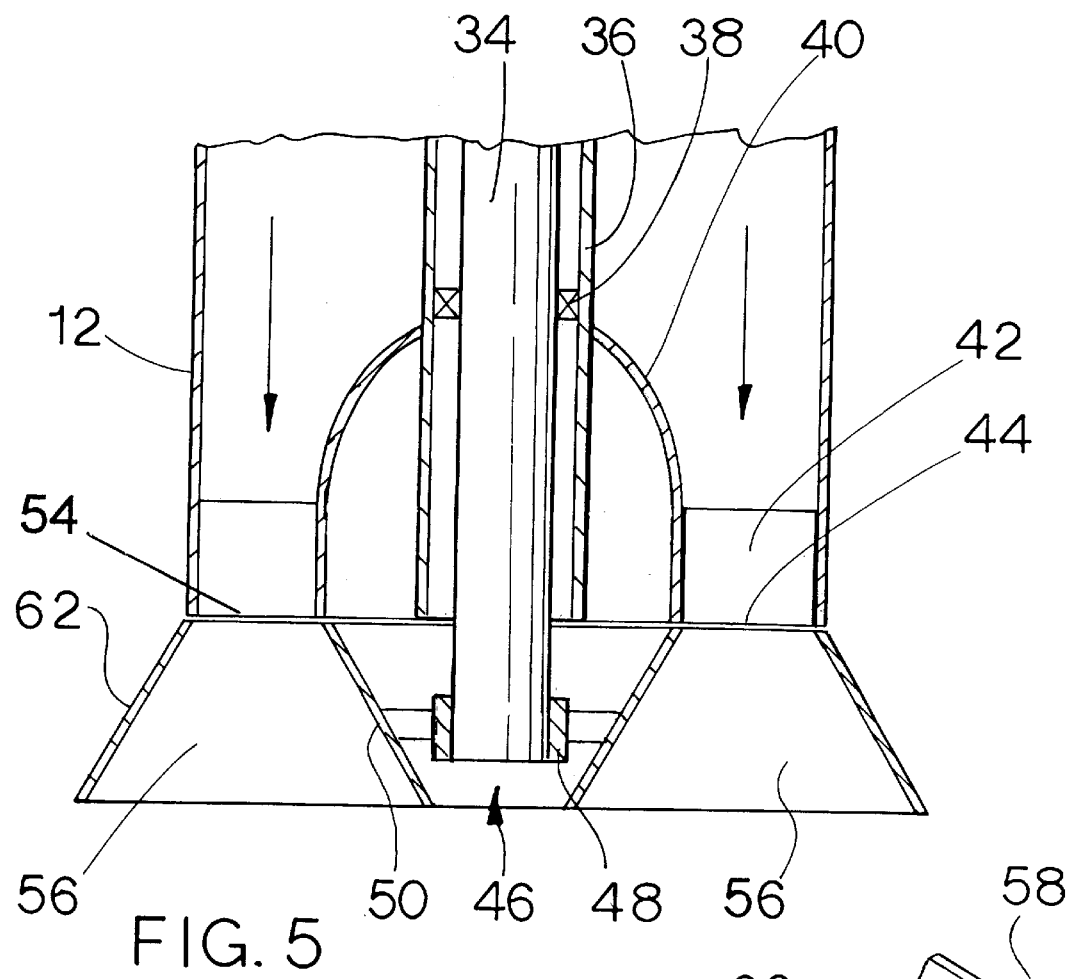
FIG. 5
FIG. 6
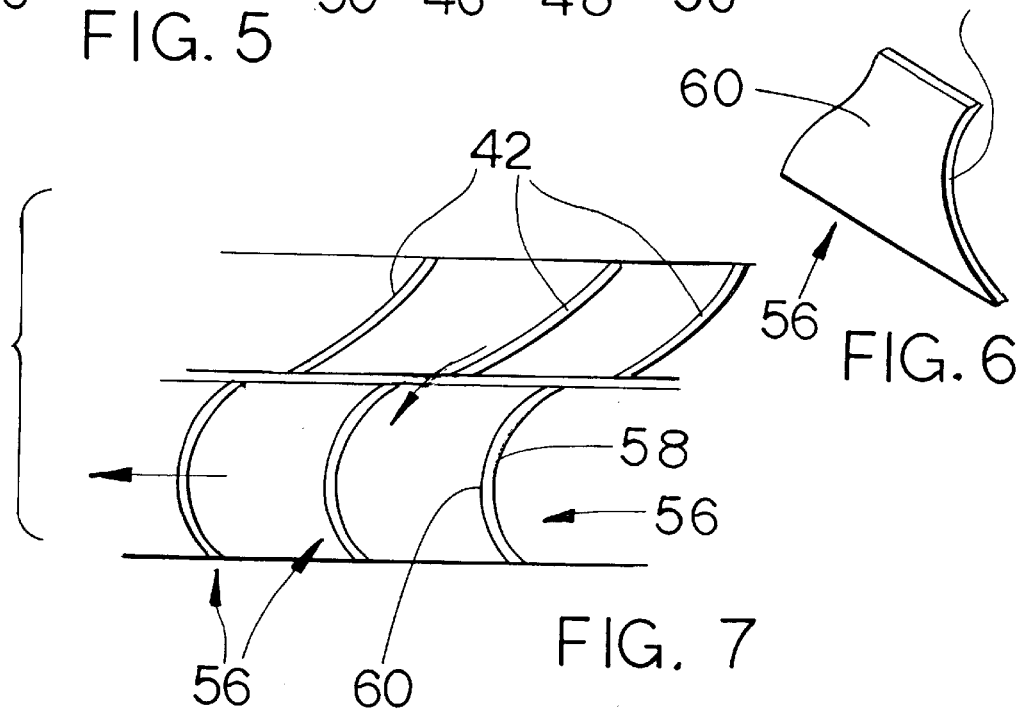
FIG. 7

LOW HEAD TURBINE

FIELD OF THE INVENTION

The invention relates to water driven turbines, and in particular to a turbine designed for use with "low head" water flows.

BACKGROUND OF THE INVENTION

Hydro-electric generation in the past has focussed on mega-projects, where massive water flows caused by natural features such as waterfalls, or by man made structures such as huge dams, were used to drive massive turbines usually of the Francis type which in turn generated large amounts of electricity for distribution over wide areas. It has been apparent for many years that the availablity of water falls of flows of this magnitude have all been identified and all available use has been made of them.

The future of large scale electric power generation now depends almost exclusively on fossil fuels, or nuclear energy. These are both energy sources with high levels of pollution and contamination. They are also energy sources which have a reasonably predictable short lifespan after which they will have been consumed, and will not be available to future generations of people. Wind power and solar collectors have not proven an acceptable alternative. Recently more attention has been given to small scale electrical generation. It has numerous attractive advantages. It does not require transmission over long distances, with its resultant large power losses.

Small scale generation does not require the erection of large generating plants which are unsightly and unpopular, or the erection of transmission towers and high voltage transmission wires which are costly, unsightly, and are widely believed to be a health hazard for those nearby, and does not involve the consumption of rapidly dissappearing fuel sources, or the creation of large scale pollution or contamination. Studies have shown that small scale power generation can make major reductions in the power generating needs of large utilities, and indeed systems are already available by which small scale generators, which may generate surplus power, can feed that surplus back into the main power distribution grids, and thus actually reduce the load on the major power generating systems.

These smaller scale systems have to a large extent been based either on wind power or solar collectors. Both are somewhat unreliable, being highly seasonal in output, especially in the case of solar collectors, which produce the least power in the colder months when power demand is highest, and which are less efficient in northern, colder climates due to shorter periods of sunshine. Windpower is suitable only in certain specialised areas where strong winds are fairly constant. Water power for smaller scale generation has largely been ignored due to the tendency of persons to think only in terms of massive turbines for large hydroelectric projects.

However the fact cannot be disputed that there are a very large number of streams and small rivers which do have significant water flows, and water drops. These could be employed, given a suitable design of low speed turbine capable of developing power at lower rotational speeds and using these more modest water flows.

BRIEF SUMMARY OF THE INVENTION

With a view to providing a solution to at least some of the foregoing problems so as to utilise water flows having relatively small water drops for electrical generation the invention comprises a low speed water driven turbine, which comprises, a housing adapted to be erected vertically in a water course and defining an upper end and a lower end, a water intake at said upper end of said housing, and a water outlet at said lower end, guide means at said upper end for guiding water into said upper end, a vertical mounting shaft rotatably mounted along a central vertical axis of said housing, bearing means for said shaft, a shaft sleeve non-rotatably mounted in said housing and supporting said shaft bearings and enclosing said shaft, a guide casing of generally bell-like shape and defining a lower edge, said casing being connected to said shaft sleeve and fixed therewith within said housing and extending outwardly from said shaft whereby to define a reduced cross-sectional area within said housing in the region of said guide casing, a blade mounting hub driveably mounted at the lower end of said shaft, a plurality of turbine blades mounted around said hub and extending outwardly therefrom said blades being mounted at angles with respect to said vertical axis of said housing, and being located to receive water from said reduced cross-sectional portion of said casing, whereby water passing down through said housing will flow past said blades and cause rotation of said shaft, and, a plurality of control vanes mounted between said housing and said guide casing at said point of reduced cross-section thereof for directing flow of water onto said blades. In one embodiment the turbine blades are narrower at the upper ends and are wider at their lower ends.

The invention further provides such a water driven turbine wherein said turbine blades are formed into a curved shape defining concave and convex surfaces, with said concave surfaces being oriented to receive said water flowing down through said housing.

The invention also envisages the use of control vanes supporting said guide casing in said housing and being formed in a curved shape rotated at an angle to the central axis of said housing whereby to redirect water flowing downwardly and direct it in an angled flow pattern onto said blades.

The invention in one form provides a hub which comprises a central mounting boss attached to the lower end of said shaft for driving the same, and an outer flow shell attached thereto said outer shell having a cup-like shape defining an upper edge, said upper edge being shaped and dimensioned to conform to the shape of the lower end of said guide casing.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 5 is a section along the line 5—5 of FIG. 3;

FIG. 6 is a perspective illustration of one turbine blade shown in isolation, and, FIG. 7 is a side elevation of three turbine blades and three guide vanes.

DESCRIPTION OF A SPECIFIC EMBODIMENT

As already explained the invention provides a low head turbine specifically for use as an electrical generator. It will however be understood that the turbine may be used for other purposes than generating electricity, although such other purposes and uses are not described herein since it believed they will be self evident.

Figure 1:
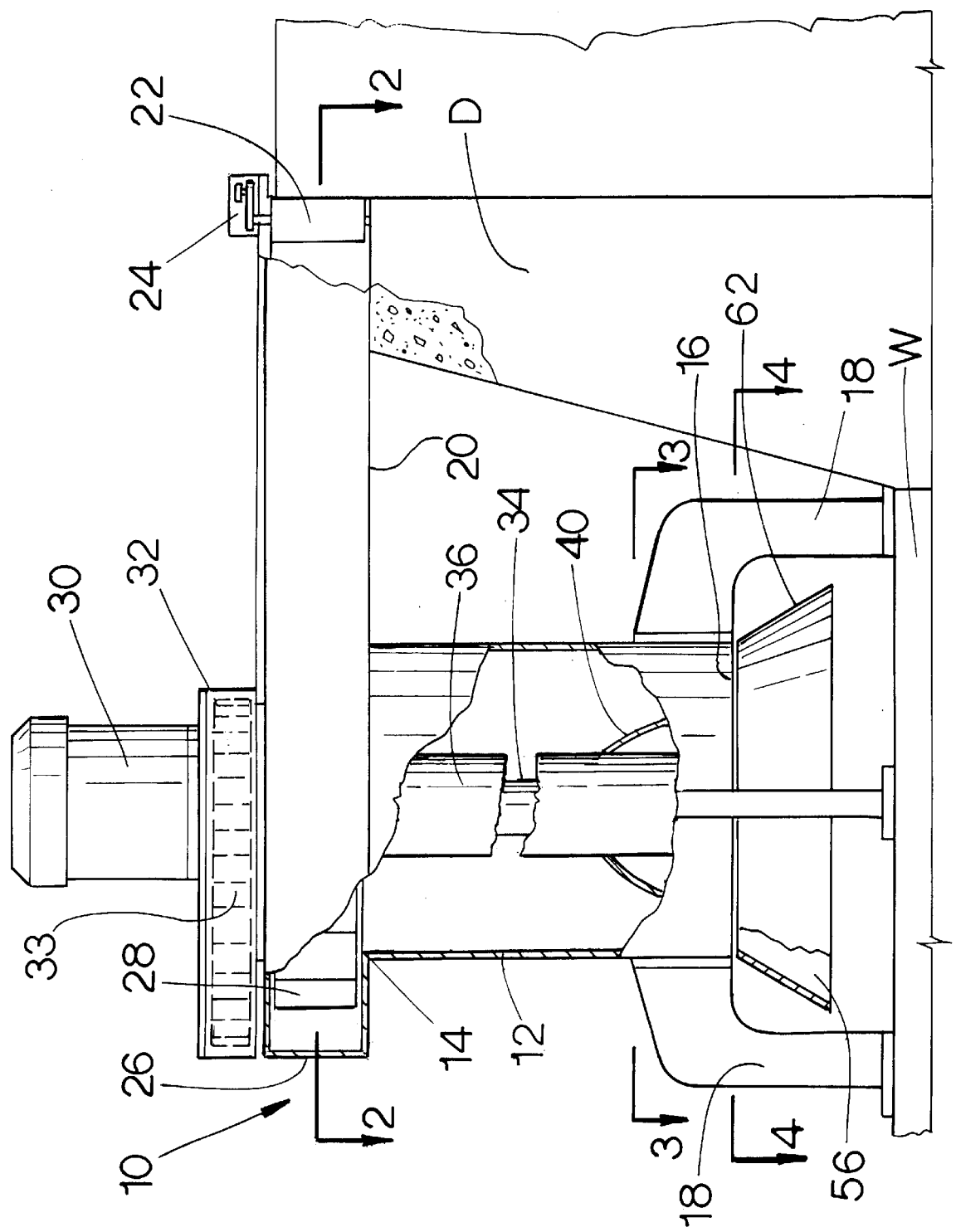
FIG. 1 is a side elevational view partly in section showing one form of low head turbine generator, shown in position in a water course, for the purposes of illustrating the invention.
Figure 2:
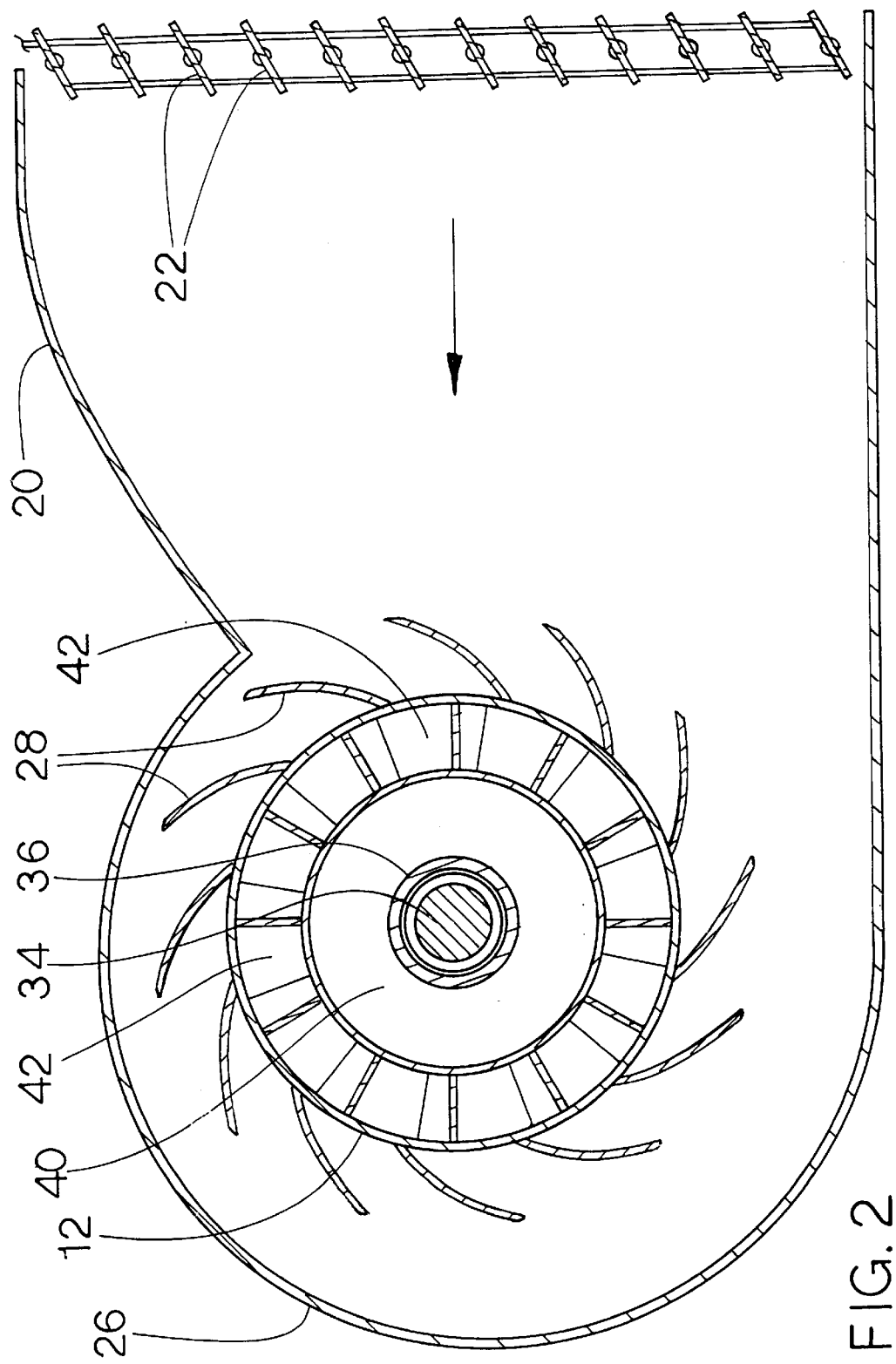
FIG. 2 is a section along the line 2—2 of FIG. 1.
Figure 3:
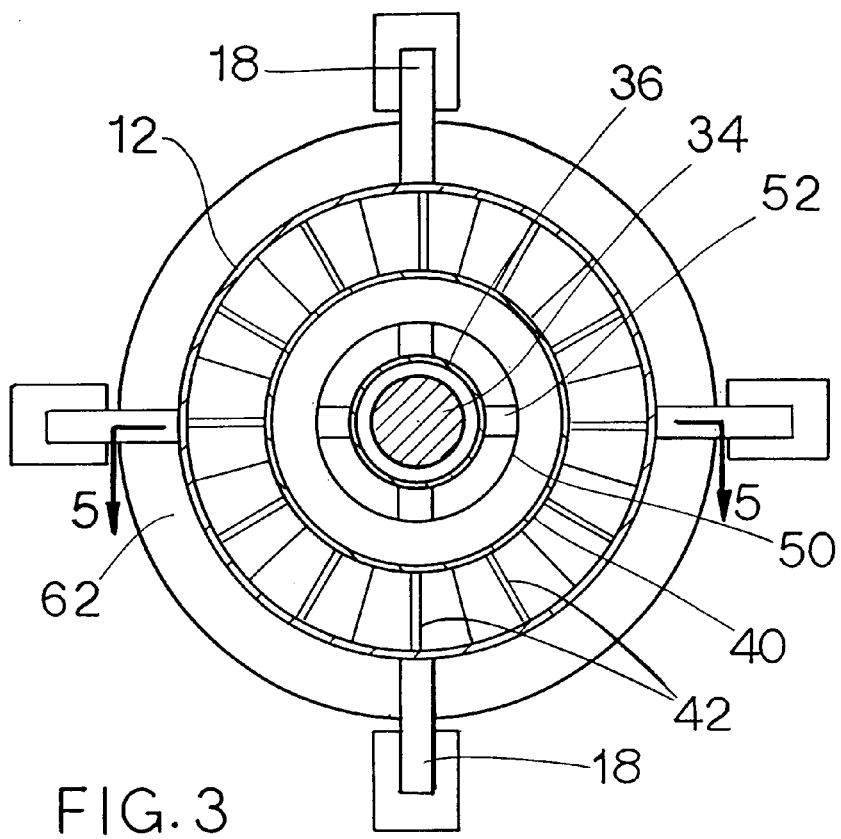
FIG. 3 is a section along the lines 3—3 of FIG. 1.
Figure 4:
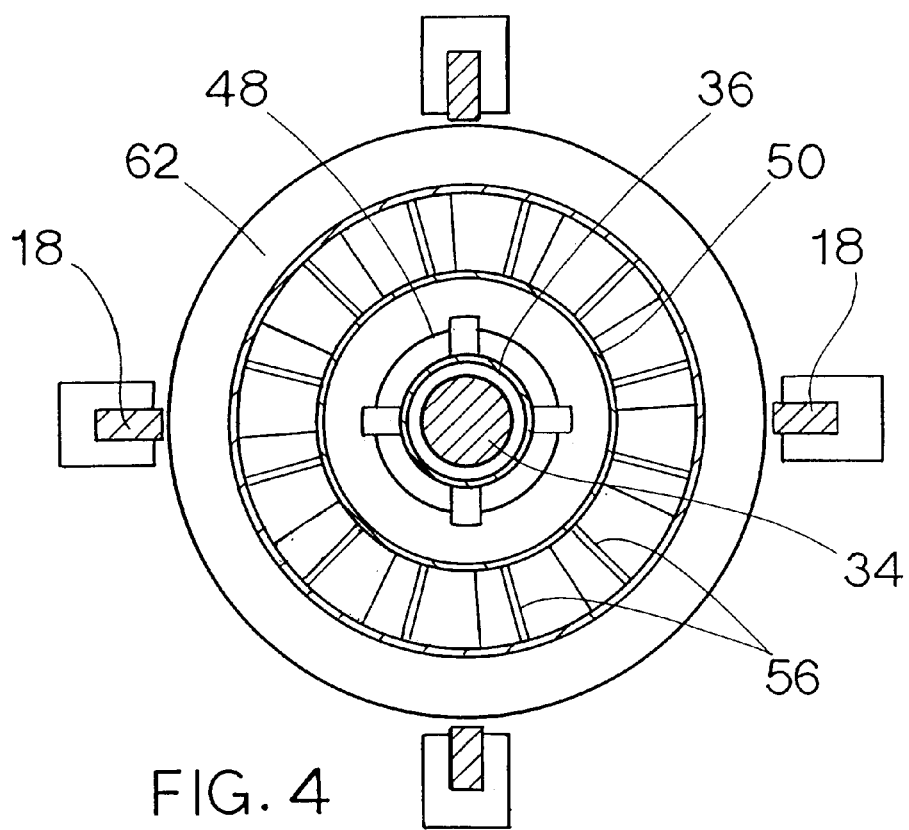
FIG. 4 is a section along the line 4—4 of FIG. 1.

FIG. 1 illustrates a low head turbine 10 as being generally representative of the invention for explanatory purposes.

The turbine 10 is shown placed in a water course indicated as W and is mounted just downstream of a small dam D. Such a dam D might be only a few feet in height and the stream might have a flow rate of between 10 and 20 feet per second. The turbine consists in this embodiment of the invention, of a generally cylindrical housing 12, having an upper end 14 and a lower end 16. It stands on legs 18 so that its lower end is clear of the stream bed. Secured to upper end 14 is a water chute 20 which extends over the top of dam D and receives water from upstream of the dam. Chute 20 has rotatable fins 22 at its upstream end to exclude larger waste items that might be flowing in the stream. Fins 22 are coupled together for operation by for example a lever 24 so that they can be swung between open and closed positions. The downstream end of chute 20 communicates with the upper end 14 of housing 12 so that water flowing down chute 20 will reach housing 12. Chute 20 has a generally annular wall 26 so as to cause the water to swirl in a clockwise fashion, and thus take advantage of the coriolis effect exhibited naturally by water flowing downwardly in a clockwise spiral within a confined space. Mounted on chute 20, around the top end 14 of housing 12, are a plurality of swirl guides 28. Guides 28 are mounted in a non-radial manner so as to catch water flowing in chute 20 and start it flowing in a rotary swirling pattern even before it enters housing 12.

The water will then flow in a spiral vertically downwardly through housing 12 in a rotary swirling fashion.

Mounted above housing 12 and chute 20 there is shown, for the purposes of illustration, an electrical generator 30 and gear box 32. Gears 33 are shown in phantom for the sake of illustration.

Within housing 12 there is a central drive shaft 34 extending up the central axis of housing 12 and connecting with gear box 32. A mounting sleeve 36 is secured to the underside of gear box 32 and extends down throughout housing 12 around shaft 34. Shaft bearings 38 are secured in sleeve 36 to provided a rotatable mounting for shaft 34. The upper end of shaft 34 (not shown) enters gear box 32 for driving a gear train which then drives the generator.

At the lower end of sleeve 36 there is a gradually entarging generally bell-like flow guide casing 40 which progressively reduces the cross-sectional area of the interior of the housing, so as to provide a restricted water flow space between guide casing 40 and housing 12. In this space at the lower end of housing 12 there are a plurality of generally radial control vanes 42. Vanes 42 extend between housing 12 and guide casing 40 and function to secure casing 40 and sleeve 36 in position centrally within housing 12.

Guide casing 40 terminates in a lower edge 44 which is co-planar with the lower edges of the control vanes 42.

Shaft 34 extends downwardly below the lower edge of housing 12 and is secured in blade mounting hub 46. Hub 46 consists of a central boss 48, and an outer flow shell 50 secured to boss 48, by means of radial spokes 52. Shell 50 is of generally cup-shape and defines an upper edge 54 which is substantially the same diameter as the lower edge 44 of bell guide casing 40, and is closely juxtaposed to it. In this way water flowing around flow guide casing 40, will continue its flow around shell 50. Mounted on shell 50 are a plurality of turbine blades 56. Each turbine blade is of generally truncated triangular shape with its wider portion extending downwardly. Blades 56 are curved in section, see FIGS. 6 and 7, and define a concave surface 58 and a convex surface 60. The outer edges of the blades 56 are secured to a generally frusto conical skirt 62. The concave surfaces are oriented to receive water flowing downwardly through vanes 42 and receive rotary driving impulses, thereby rotating the shaft 34. The turbine blades 56 are all mounted at an angle to the axis of shaft 34 so that water impinging on the blades will impart a rotary force. Control vanes 42 are also of curved shape in section, and are mounted in such a way as to redirect water flowing through the vanes into an angular flow pattern, so that the water from each vane 42 strikes the turbine blades 56 in a sideways and slightly downward manner, thus applying the maximum force.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A water driven turbine for operating with relatively low-head water flows, and comprising;

a housing adapted to be erected vertically in a water course and defining an upper end and a lower end;

a water intake at said upper end of said housing, and a water outlet at said lower end;

guide means at said upper end for guiding water into said upper end;

a vertical drive shaft rotatably mounted along a central vertical axis of said housing and, bearing means for said shaft;

a shaft sleeve non-rotatably mounted in said housing and supporting said shaft;

a guide casing of generally bell-like shape and defining an upper end connected to said shaft sleeve and fixed therewith within said housing and extending outwardly from said shaft whereby to define a reduced cross-sectional area within said housing in the region of said guide casing;

a blade mounting hub driveably mounted at the lower end of said shaft;

a plurality of turbine blades mounted around said hub and extending outwardly therefrom said blades being mounted at angles with respect to said vertical axis of said housing, and being located to receive water from said reduced cross-sectional portion of said casing, whereby water passing down through said housing will flow past said turbine blades and cause rotation of said shaft.

2. A water driven turbine as claimed in claim 1 wherein said turbine blades are narrower at their upper ends and are wider at their lower ends.

3. A water driven turbine as claimed in claim 1 wherein said turbine blades are formed into a curved shape defing concave and convex surfaces, with said concave surfaces being oriented to receive said water flowing down through said housing.

4. A water driven turbine as claimed in claim 1 and further including a plurality of control vanes mounted between said casing and said housing at said point of reduced cross-section thereof for directing flow of water onto said blades in a downwardly angled direction to achieve maximum impact of water on said turbine blades.

5. A water driven turbine as claimed in claim 1 and wherein said hub comprises a central mounting boss attached to the lower end of said shaft for driving the same, and an outer flow shell attached thereto said flow shell having a cup-like shape defining an upper edge said upper edge being shaped and dimensioned to conform to the shape of the lower end of said guide casing.

6. A water driven turbine as claimed in claim 4 wherein said control vanes extend between said guide casing and said housing and function to secure said sleeve in position.

7. A water driven turbine as claimed in claim 6 wherein said control vanes are of curved shape in section and are mounted at angles to the central axis of said housing whereby to direct water in an outward and downwardly angled direction.

8. A water driven turbine as claimed in claim 1 including a gear casing at the upper end of said housing said sleeve being attached to said gear casing whereby to totally enclose said shaft, with said shaft extending into driving engagement in said gear housing.

9. A water driven turbine as claimed in claim 8 including a gear drive system in said gear casing and an electrical generator connected to said gear drive system.

10. A water driven turbine as claimed in claim 1 and including a water chute connected to said upper end of said housing, and rotatable fins mounted on said chute for controlling flow of water therein.

11. A water driven turbine as claimed in claim 10 and including a generally annular wall around the upper end of said housing connecting with said chute and operating to receive water from said chute and guide water in a clockwise rotary flow path as it enters said housing thereby starting a coriolis effect of swirling downwardly flowing water within said housing.

12. A water driven turbine as claimed in claim 11 and including swirl guides mounted in said chute around the upper end of said housing to assist in guiding water flowing therein into a rotary swirling flow pattern.

13. A water driven turbine driving an electrical generator and for operating with relatively low-head water flows and comprising;

a housing adapted to be erected vertically in a water course and defining an upper end and a lower end;

a water intake at said upper end of said housing, and a water outlet at said lower end;

a water chute connected to said upper end of said housing, and rotatable fins mounted on said chute for controlling flow of water therein;

a generally annular wall around the upper end of said housing connecting with said chute and operating to receive water from said chute and guide water in a clockwise rotary flow path as it enters said housing thereby starting a coriolis effect of swirling downwardly flowing water within said housing;

swirl guides mounted in said chute around the upper end of said housing to assist in guiding water flowing therein into a rotary swirling flow pattern;

a vertical drive shaft rotatably mounted along a central vertical axis of said housing and, bearing means for said shaft;

a shaft sleeve non-rotatably mounted in said housing and supporting said shaft;

a gear casing at the upper end of said housing said sleeve being attached to said gear casing whereby to totally enclose said shaft, with said shaft extending into driving engagement in said gear casing;

a gear drive system in said gear casing and an electrical generator connected to said gear drive system;

a guide casing of generally bell-like shape and defining an upper end connected to said shaft sleeve and fixed therewith within said housing and extending outwardly from said shaft whereby to define a reduced cross-sectional area within said housing in the region of said guide casing;

a blade mounting hub driveably mounted at the lower end of said shaft; said hub having a central mounting boss attached to the lower end of said shaft for driving the same, and an outer flow shell attached thereto said flow shell having a cup-like shape defining an upper edge said upper edge being shaped and dimensioned to conform to the shape of the lower end of said guide casing;

a plurality of turbine blades mounted around said hub and extending outwardly therefrom said blades being mounted at angles with respect to said axis of said housing, and being located to receive water from said reduced cross-sectional portion of said casing, whereby water passing down through said housing will flow onto and past said turbine blades and cause rotation of said shaft, said turbine blades being narrower at their upper ends and wider at their lower ends and being formed into a curved shape defining concave and convex surfaces, with said concave surfaces being oriented to receive said water flowing down through said housing, and, a plurality of control vanes mounted between said bell guide casing and said housing at said point of reduced cross-section thereof for directing flow of water onto said turbine blades in a downwardly angled direction to achieve maximum impact of water on said turbine blades, said control vanes extending between said guide casing and said housing and securing said sleeve in position.

\* \* \* \* \*